Aug. 12, 1941.  F. G. SCOBIE  2,252,648
DEVICE FOR CLAMPING CRANES AND THE LIKE
Filed March 8, 1940  2 Sheets-Sheet 2
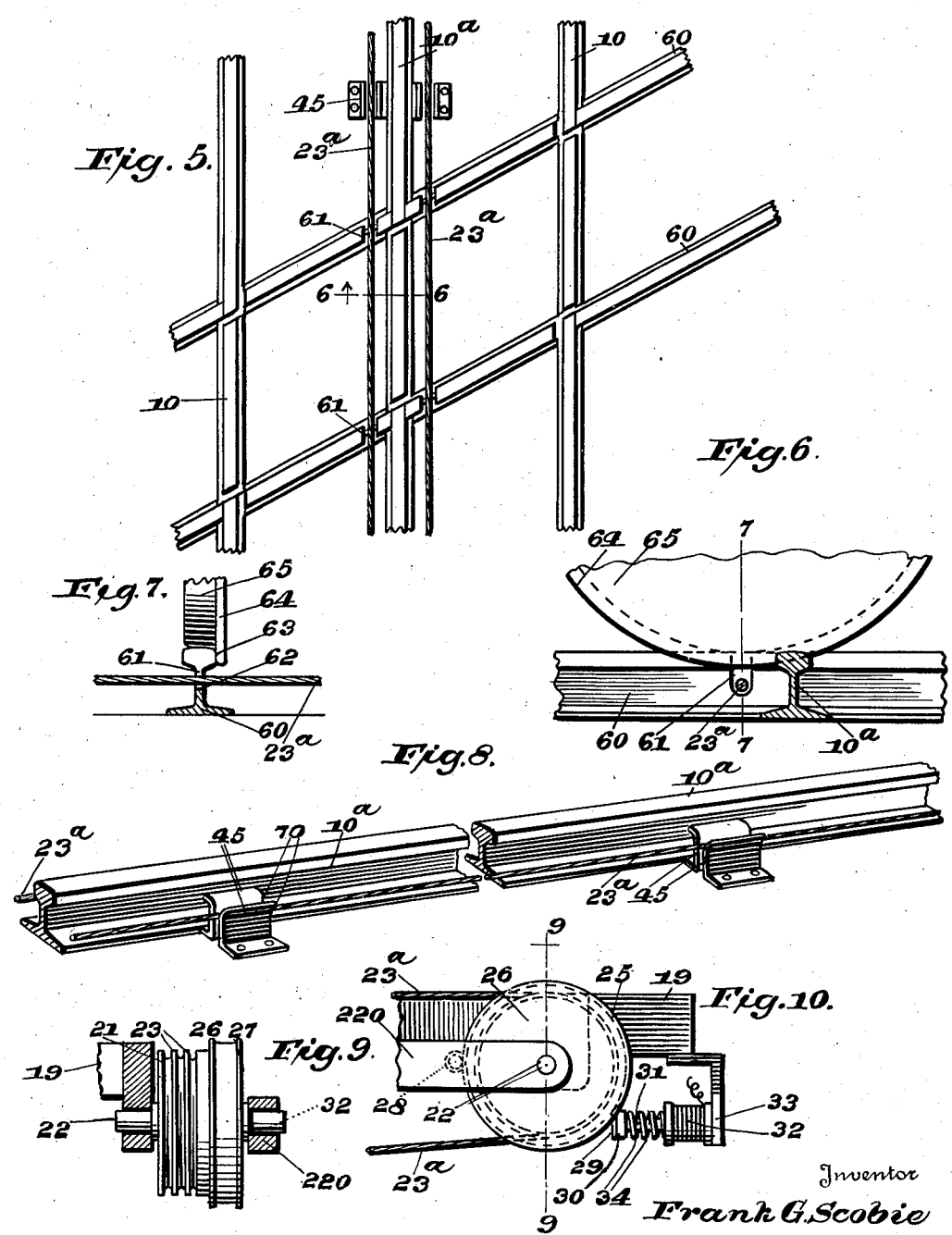
Inventor
Frank G. Scobie
By Munn, Anderson & Liddy
Attorney Patented Aug. 12, 1941

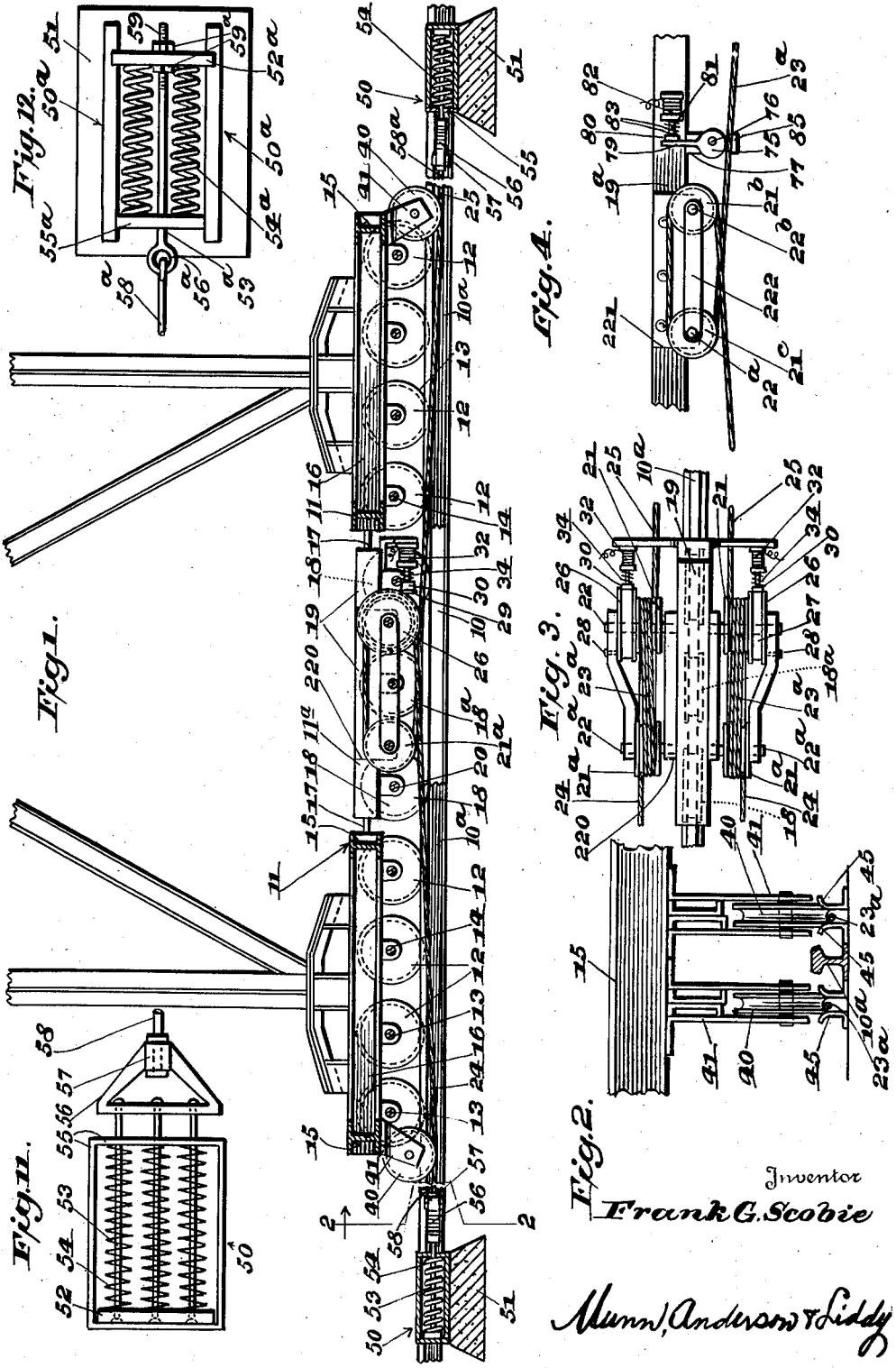

2,252,648

UNITED STATES PATENT OFFICE 2,252,648

DEVICE FOR CLAMPING CRANES AND THE LIKE

Frank G. Scobie, Duluth, Minn.

Application March 8, 1940, Serial No. 323,049

3 Claims. (Cl. 188—33)

This invention relates to a device for anchoring cranes, coal bridges, ore bridges or similar machines against wind or other pressure tending to move them along rails or runways on which they are mounted.

An object of the invention is the provision of a device for anchoring machines in position which are carried by wheeled trucks in such a manner that cables having an intermediate portion wound upon drums and connected with cushioning means will maintain the required tension on the cables at all times to prevent too great a strain on the cables and thus prevent breakage.

Another object of the invention is the provision of a device for anchoring cranes or other machines which are carried by wheeled trucks on a runway in such a manner that the fastening means will be permitted to shift in opposite directions for eliminating strain on said fastening means while maintaining the required tension on said fastening means to hold the wheeled truck in a predetermined position against wind and other pressure tending to move the trucks along the runways.

A further object of the invention is the provision of a device for anchoring cranes, bridges, or similar machines against wind pressure or other forces tending to move the device along a runway and including a series of rotatable drums each series having an intermediate portion of a cable wound thereon with the ends of the cables being supported beyond the opposite ends of the device by nests of springs flexibly connected with the ends of the cable to cushion the cable, thereby providing for flexibility and absorption of shocks incident to wind pressure or other forces, braking means being employed on the wheeled trucks in cooperation with the cables for holding the trucks against movement.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a longitudinal view in elevation of a wheeled truck carrying a crane and showing means for holding the wheeled truck in a predetermined position on a track, Figure 2 is a fragmentary vertical section taken along the line 2—2 of Figure 1 showing the cable guides and center rail, Figure 3 is a fragmentary plan view of the retaining means for the trucks, Figure 4 is a side view in elevation of a modified form of the braking means for the cable wound on the drum, Figure 5 is a plan view of a railroad crossing showing the position of the parts when the railroad crosses a runway for a wheeled truck, Figure 6 is a vertical section taken along the line 6—6 of Figure 5, Figure 7 is a vertical section taken along the line 7—7 of Figure 6, Figure 8 is a view in perspective of a rail showing spaced guides for a cable, Figure 9 is a fragmentary section of the braking device taken along the line 9—9 of Figure 10, Figure 10 is a fragmentary enlarged side view of the braking device, Figure 11 is a detached plan view of the cushioning means for the cables, Figure 12 is a detached plan view of a modified form of cushioning means.

Referring more particularly to the drawings, 10 designates a pair of spaced rails of a runway on which spaced wheeled trucks, generally designated by the numeral 11 are mounted. A plurality of wheels 12 are of the usual type and are located at each side of the trucks and ride on the rails 10. Said wheels support axles 13 while the axles are connected to the trucks by bearings 14 depending from the frames of the trucks. Transversely disposed I-beams 15 are located at the front and rear of each truck and are connected together by longitudinal beams 16 at the sides of the trucks.

A bridging truck 11$^a$ is located between the trucks 11 and has its opposite ends connected to the adjacent ends of the trucks 11 by a connection indicated at 17. This truck is supported by wheels 18 and 18$^a$ riding on a center rail 10$^a$. A longitudinal beam 19 is supported by axles 20 supported by the longitudinally alined wheels 18 and 18$^a$.

Pairs of pulleys 21 and 21$^a$ are mounted on respective axles 22 and 22$^a$ carried in bearings supported from the beam 19. The pulleys are located at opposite sides of said beam and each pulley is provided with a spiral groove 23 as shown more particularly in Figure 9 to receive a cable 23$^a$, the opposite ends 24 and 25 of which extend towards and beyond the trucks 11. The intermediate portions of the cables are wound upon the pulleys so that the pulleys will be revolved as the trucks tend to shift to the right or left in Figure 3. Bent bars 220 are provided with bearings at the opposite ends for the outer ends of the shafts 22 and 22ª.

A brake drum 26 is connected to each of the pulleys 21 and a brake band 27 is engaged around each brake drum. One end of each band is pivotally connected at 28 to an associated bar 220 while the other end 29 is secured to a block 30 mounted upon a rod 31. One end of the rod projects into a solenoid 32 which is mounted on a bracket 33 secured to the under face of the beam 19. A spring 34 surrounds the rod 31 and has one end in engagement with one end of the solenoid 32 while the other end is in engagement with the block 30 so that the spring will tend to move the end 29 of the band 27 towards the bar 220 for maintaining the band tight on the brake drum 26 and thus hold the drum 21 against rotation. The solenoid is in a circuit (not shown) and this circuit includes the power plant for operating the bridge or crane, as the case may be, for moving said bridge or crane as desired. When the circuit to the solenoids 32 are closed the rods 31 will be withdrawn or moved to the right in Figures 1 and 10, against the tension of the springs 34 and thus release the brake bands 27 so that the drums 21 may be revolved. It will be noted from Figure 3 that identical arrangements of drums, solenoids, springs and rods are located at each side of the beam 19.

The ends of the cables extend downwardly through the opposite ends of the trucks 11 and are trained over grooved pulleys 40 carried by brackets 41 projecting from the ends of the truck and outwardly therefrom. The brackets are secured to the bottoms of the I beams 15. Thus the ends of the cables will be brought downwardly and held below the tread of the rail 10ª.

The cables are extended beyond the opposite ends of the trucks 11 and along opposite sides of the rail 10ª as shown in Figure 2 and are guided by pairs of spaced ears 45 which are secured in any approved manner to the cross ties or to a plate carried by the cross ties.

A housing at each side of the rail 10ª and generally designated by the numeral 50 (Fig. 11) is rigidly connected to a concrete block 51. These blocks are spaced a predetermined distance apart and the trucks 11 are movable between these blocks. Each housing has a movable cross head 52 therein to which are connected spaced rods 53 and a coil spring 54 embraces each rod and has one end abutting the cross head 52 while the other end engages the inner end 55 of the housing. The inner ends of the rods 53 are slidable in passages in the end 55 of the housing.

A bridging member 56 is connected to the rods 53 and also to an end of a rod 58, as shown at 57, in any approved manner. Each cable 23ª is connected to a rod 58 in any approved manner at each side of the rail 10ª. It will be seen by this construction that the cross head in each housing 50 is guided by said housing when there is a pull on an end 24 or 25 of the cables by the movement of the trucks 11. At this time the cross head will be moved inwardly of the housing and the springs 54 will be placed under tension thereby resisting the pull of the cables 23a so that the ends of the cable will be cushioned and the strain on the cable will be decreased, thus preventing breakage of the cable when wind pressure or other forces tend to move the trucks along the rails.

Referring more particularly to Figures 5 to 7, inclusive, it will be seen that a track composed of a pair of rails 60 cross the rails 10 and 10ª and the usual construction of frog is employed for the purpose. The rails 60 adjacent the rails 10ª and the cables 23ª are provided with notches 61 of sufficient depth to receive the cables 23ª so that said cables will be below the flanges of the wheels of the train passing along the rails 60. Thus the cables will not be cut or marred. These notches 61 are shown more particularly in Figures 6 and 7 with the bottom 62 of each notch considerably below the treads 63 of the rails 60 so that the flanges 64 of the wheels 65 will revolve in spaced relation with the cables 23ª and the cables will be out of contact at all times with the flanges of the wheels.

Referring more particularly to Figure 8 it will be seen that the guides 45 have their upper free ends flared, as shown at 70, to permit the cables 23ª to drop in between the spaced guides and will maintain said cables against lateral displacement with respect to the rail 10ª.

Referring more particularly to Figure 4 it will be seen that a modified form of the braking device is illustrated in which the brakes are applied directly to the cables 23ª instead of to the pulleys 21ᵇ which are mounted on an axle 22ᵇ supported by bearing bars 221 depending from the beam 19ª. Grooved pulleys 21ᶜ are alined with the pulleys 21ᵇ at each side of the beam. The pulley 21ᵇ is devoid of the brake drum 26 but is provided with the guiding grooves shown in Figure 9. Bars 222 connect the opposite ends of the axles. Wheels (not shown) similar to the wheels 18 and 18ª support the beam 19ª and pulleys above the track 10ª.

Eccentrics 75 at each side of the beam 19ª are pivotally mounted on a shaft 76 which is carried by a bracket 77 secured to and depending from said beam in front of the pulley 21ᵇ. The eccentrics are each provided with an operating arm 79 which is connected to a block 80 carried at one end of a rod 81 which extends into a respective solenoid 82 at each side of the beam 19ª so that when the solenoids are energized the rods will be drawn inwardly of the solenoids and the blocks 80 will move the arms 79 outwardly from the pulleys 21ᵇ. A coil spring 83 embraces each rod 81 and bears against the respective block 80 to force said block against the associated arm 79. When the solenoids are energized the blocks 80 are drawn to the right in Figure 4 against the tension of the springs 83 to release the arms 79 and the eccentrics 75.

The cables 23ª are normally located between flanges 85 formed at the bottom of the bracket 77 and the eccentric 75 so that when the cam portions of the eccentrics are moved into engagement with the cables 23ª by rocking of the arms 79, said cables will be clamped against the flanges 85 thereby retaining the cables against slippage.

Referring more particularly to Figure 12 it will be seen that a modified form of the cushioning means is illustrated. A frame at each side of the rail 10ª is provided which has spaced side walls 50ª mounted rigidly upon a concrete base 51. A front wall 55ª is not only rigidly connected to the inner ends of the side walls 50ª but it is secured rigidly to the base 51. A sliding bar 52ª has its ends engaging a guide on the side walls 50ª and is movable towards or away from the front wall 55ª.

Compression springs 54ª are located between the wall 55ª and the slidable bar 52ª. A rod 53ª has its outer end threaded as shown at 59 and passing through an opening in the bar 52ª. Nuts 59ª at opposite sides of the bar 52ª secure the outer end of the rod to said bar.

The inner end of the rod 53ª passes through an opening in the front wall 55ª and is provided with an eye 56ª adapted to receive a hook on a rod 58ª. The inner end of this rod is connected in any approved manner to the outer end 25 of a cable 23ª.

In the form shown in Figure 12, when tension is applied to the cables the rod 53ª is drawn inwardly as will be the cross head or bar 52ª thereby placing the spring 54ª under tension so that these springs will absorb the shocks when the trucks on the rails are moved in either direction in any manner.

The operation of my device is as follows: As has been explained above, the invention is predicated upon a device for holding various types of machines in a predetermined position on a runway or track by means of cables coiled over grooved pulleys with the ends of the cables connected to crossheads adapted to compress a plurality of springs whenever force is applied to the ends 24 and 25 of the cables. The resilient cushions to which the ends of the cable are connected provide for a certain amount of flexibility of the cables 23ª so that when a force is exerted against the truck by either natural or mechanical means the springs will resist the pull of the cable so that some of the shock or force is absorbed by the springs, thereby eliminating the usual strain on the cable where the cable is maintained taut for holding a wheeled truck in position.

While I have shown three springs it will be appreciated that any number of springs may be mounted in the housing and the number and strength of the springs depends upon the amount of work that will be required of them.

I claim:

1. In an anchoring mechanism, a pair of spaced trucks mounted on spaced rails, an intermediate narrow truck connecting the spaced trucks together and supported in a vertical plane by the spaced trucks, a single rail track running longitudinally beneath the trucks, wheels on the intermediate truck located in a single vertical plane and supported by the single rail, rotatable members mounted on the intermediate truck at opposite sides of the rail, a cable at each side of the intermediate truck and having a portion thereof wound on the rotatable members, fixed supports, one of each supports being located beyond the outer ends of the trucks, resilient means mounted in the supports, means connected to each end of the cables and adapted to compress the springs when a pull is exerted on the cables, and braking means associated with the rotatable members for retaining said members and likewise the trucks against movement.

2. In an anchoring mechanism, a pair of spaced trucks mounted on spaced rails and provided with grooved wheels, an intermediate narrow truck connecting the spaced trucks together and supported in a vertical plane by the spaced trucks, a single rail track running longitudinally beneath the trucks, wheels on the intermediate truck, located in a single vertical plane and supported by the single rail, rotatable members mounted on the intermediate truck at opposite sides of the rail, a cable at each side of the intermediate truck and having a portion thereof wound on the rotatable members and frictionally received by the grooved wheels of the spaced trucks, fixed supports, one of each supports being located beyond the outer ends of the trucks, resilient means mounted in the supports, means connected to each end of the cables and adapted to compress the springs when a pull is exerted on the cables, and braking means associated with the rotatable members for retaining said members and likewise the trucks against movement.

3. In an anchoring mechanism, a pair of spaced trucks riding on spaced rails, means connecting the adjacent ends of the spaced trucks together and supported in a vertical plane by said trucks, a single rail track running longitudinally beneath the trucks, wheels on the connecting means and supported by the single rail, grooved wheels carried by the connecting means at opposite sides of the rail, a cable at each side of the intermediate truck trained on the grooved wheels, fixed supports beyond the outer ends of the trucks, resilient means supporting the ends of the cables in the supports, braking means associated with the grooved wheels for retaining said wheels and likewise the trucks against movement, and rotatable means suspended from the trucks and frictionally contacting the cables.

FRANK G. SCOBIE.